3,065,179
METAL SALTS OF PHENOLS AND LOW
MOLECULAR WEIGHT ACIDS
Arnold J. Morway, Clark, and John C. Munday, Cranford, N.J., assignors to Esso Research and Engineering Company, a corporation of Delaware
No Drawing. Filed Apr. 1, 1959, Ser. No. 803,374
7 Claims. (Cl. 252—39)

This invention relates to compositions comprising the metal salts of phenols and low molecular weight acids, to oil solutions and dispersions of said compositions, and to methods for their preparation.

The compositions of this invention can be used in fluid lubricants to impart load carrying ability and reduced wear. They can also be used as thickeners, extreme pressure agents, and anti-wear additives in greases.

In general, the additives of this invention will be prepared by coneutralizing a phenol and a low molecular weight acid with a metal base, or by reacting the metal base with the acid to form a salt and then heating the salt and the phenol until dehydrated, or until substantially all free low molecular weight acid present is removed. The mole ratio of the low molecular weight acid to phenol will be between about 0.02 to 50. High mole ratios of the acid per mole of phenol, in the range of 5/1 to 40/1 are preferred because they impart greater extreme pressure and anti-wear properties when used in lubricants.

The metal component of the composition of this invention is a polyvalent metal. Di- and tri-valent metals are preferred, with the alkaline earth metals and especially calcium being particularly preferred. Examples of the metals included within the invention are barium, chromium, cadmium, nickel, iron, cobalt, calcium, zinc, and aluminum. Mixtures of these metals may be employed if desired. The metals are usually reacted with the acid or acid and phenol mixture in the form of hydroxides and oxides, but other basic salts such as the carbonates, etc. may be used. The metal base is usually added in stoichiometric amounts, i.e. in sufficient quantity to substantially neutralize the acid and phenol.

Low molecular weight monocarboxylic acid having about 2 carbon atoms per molecule are used as the acid component. The preferred acid for use in accordance with the present invention is acetic acid. Substituted acetic acids may also be used. These substituted acetic acids include glycolic acid or hydroxy-acetic acid, thioglycolic acid or mercapto-acetic acid, monochloro-acetic acid, dichloro-acetic acid, trichloro-acetic acid and the corresponding bromo and fluoro acetic acids and mixtures of these acids with and without acetic acid.

Mixtures of acetic acid with other organic and inorganic acids in less than equimolar proportions of the latter may also be used. The other organic acids include oxalic acid, propionic acid, acrylic acid, and benzene, toluene and xylene sulfonic acids. The inorganic acids include carbonic, hydrochloric, nitric, sulfuric and phosphoric acids.

The generic formula for the acetic and substituted acetic acids to be used in accordance with the present invention is as follows: $Y_n \cdot CH_{3-n} \cdot COOH$ wherein $n$ is a digit from 0 to 3 inclusive and Y is a monovalent substituent selected from the group consisting of hydroxyl (—OH), mercapto (—SH) and halogens such as (—Cl), (—F) or (—Br), when Y=—OH or —SH, $n$ must equal 1.

The phenols which can be used in this invention will contain 0 to 4 alkyl or alkyl amino groups attached to the phenolic ring. Each alkyl or alkyl amino group can contain from 1 to 24 carbon atoms, e.g. 1 to 18 carbon atoms. Specific examples of the alkyl phenols are cresol, xylenol, 5-amyl phenol, isooctyl phenol, triisopropyl phenol and triisobutyl phenol.

The phenols useful in the preparation of the compositions of this invention can be defined by the following formula:

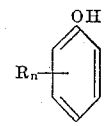

wherein R is selected from the group consisting of alkyl and alkyl amino groups having from 1 to 24 carbon atoms and $n$ represents an integer from 0 to 4. Specific examples of those compounds wherein one or more of the R's represents an alkyl amino group are: 2,6-ditertiary butyl-4(dimethyl amino methyl) phenol, 2-methyl-4(di-n-butyl amino methyl) phenol, m-di-methyl amino phenol. Mixtures of alkyl or alkyl amino phenols may also be used. A particularly preferred mixture of the alkyl phenols is a mixture of cresol and xylenols as found in tar acids.

As previously stated, the compositions of this invention may be prepared either by coneutralizing the phenols and low molecular weight acid with the metal base or by reacting the acid with the metal base to form a salt and then heating the salt with the phenol to remove water of reaction or excess free low molecular weight acid. Usually, but not necessarily, the reaction is carried out in an oil menstruum. Heating of the reaction mixture is carried out at temperatures in the range of about 180° to 600° F., and preferably about 300° to 450° F. when the compositions are prepared in an oil menstruum. The preferred embodiment of this invention is to thoroughly mix acetic acid and an alkyl phenol in a lubricating oil and then add a substantially stoichiometric amount of metal base, followed by heating to dehydrating temperatures in the range of about 250 to 550° F. Dehydration time will depend on temperature and batch size and hence is widely variable, however, the time will generally range from 15 minutes to 12 hours, e.g., about ½ hr. to 6 hours. The composition is then cooled to about 180° to 200° F. at which temperatures conventional additives, if desired, can be added. The mixture may then be homogenized such as by passing through a Gaulin homogenizer or a Charlotte mill, followed by subsequent cooling to room temperatures.

Where the compositions of this invention are prepared in an oil menstruum, the oil can be either a mineral or synthetic oil having a viscosity at 100° F. in the range of 60 to 3000 SSU. Mineral oils having a viscosity at 100° F. in the range of 100 to 1200 SSU are particularly preferred. Any synthetic lubricating oils meeting the above viscosity requirements may be used. These synthetic oils include the simple and complex ester-type oils, the alkyl silicates, polysilicones, etc.

The compositions of this invention may be used in the presence of various other additives; for example metal salts such as calcium petroleum sulfonate, and alkali and alkaline earth metal soaps of $C_{12}$ to $C_{30}$ fatty acids; oxidation inhibitors such as phenyl α-naphthylamine; viscosity index improvers such as poly-isobutylene; pour depressants; dyes and other conventional lubricant additives. Some of the conventional additives, such as sulfonates, fatty acid soaps, polyglycols, etc. can be present during the preparation of the metal salts of this invention to also serve as dispersing agents. When fatty acid soaps are employed with the compositions of this invention in lubricating oils, the soaps will comprise about 0.5 to 5 weight percent of the total compositions.

The metal salt compositions of this invention when used as additives in fluid lubricants, preferably lubricants having a viscosity in the range of 100 to 1200 SSU at 100° F., will comprise about 0.2 to 20 weight percent of the total composition. When the metal salts of this invention are used as thickeners to form lubricating greases they will comprise about 10 to 40 weight percent of the total composition. The shorter the alkyl chain (i.e. the smaller the number of carbon atoms in the alkyl group) attached to the phenolic radical the greater the thickening power of the resultant metal salt composition. Thus, smaller weight percentages of the compositions of this invention which contain short alkyl chains upon the phenolic radical are required to thicken a lubricating oil to a grease consistency.

The invention will be further understood by the following examples which include the preferred embodiments of this invention.

EXAMPLE I

The following formulations were prepared to illustrate the preparation of the compositions of this invention in the absence of an oil medium and at relatively high molar proportions of the alkyl phenol per molar proportion of acetate.

Three solutions designated A, B, and C, of dodecyl phenol and chromic acetate were prepared in about 200 ml. of absolute ethanol. The solutions were heated on a steam bath at temperatures between 180° and 300° F. until all the alcohol was removed. The approximate mol ratios of dodecyl phenol to chromic acetate and the weight percent chromium in the product for the three solutions were as follows:

*Table I*

| Solution | Mol Ratio Phenol to Chromic Acetate | Wt. Percent Chromium in Product |
|---|---|---|
| A | 3/1 | 1.62 |
| B | 6/1 | 3.20 |
| C | 12/1 | 6.23 |

The above compositions ranged from viscous liquids (A), to rubbery-like solids (C), depending upon the phenol/chromic salt ratio. The products resulting from solutions A, B and C were all hydrocarbon-soluble.

The compositions of this invention may also be prepared by substituting any of the following polyvalent metals for the chromium of A, B, and C above: barium, calcium, cadmium, nickel, cobalt, iron, zinc and aluminum.

EXAMPLE II

The following compositions were prepared to illustrate the preparation of the compositions of this invention in an oil menstruum at both equal and relatively high mol ratios of acetate to phenolate:

*Table II*

| Composition, Wt. Percent | A | B |
|---|---|---|
| Dodecyl Phenol | 33.1 | 2.1 |
| Acetic Acid | 7.6 | 4.7 |
| Hydrated Lime | 9.3 | 3.2 |
| Naphthenic-type mineral oil (77 SSU at 210° F.) | 50.0 | 90.0 |
| Mol Ratio Acetate/Phenolate | 1/1 | 10/1 |
| Properties | smooth, viscous, homogenous, translucent lubricant. | opaque, fluid lubricant. |

*Preparation.*—In each case the lime and oil were mixed intimately with heating. The phenol and acetic acid were added and the mixture heated to about 300° F. with continued agitation until evolution of gas (water vapor) stopped.

Composition A may be cut back with a lubricating oil to form a concentrate liquid additive.

EXAMPLE III

Table III gives the weight percent composition and properties of excellent lubricating greases prepared by coneutralizing the phenol and acetic acid in mineral oil with hydrated lime (calcium hydroxide).

*Preparation.*—The compositions of Table III were prepared by charging hydrated lime and mineral oil of 55 SSU viscosity at 210° F. to a grease kettle and intimately mixing. The phenolic compound and acetic acid were blended and the blend charged to the lime and mineral oil slurry with continued mixing at a temperature of about 125° to 180° F. Heating was then continued until the temperature of the reaction mixture reached about 320° F. This temperature was maintained for about 15 minutes whereupon the temperature was lowered to 200° F. and phenyl α-naphthylamine was added as an oxidation inhibitor. The greases were next Morehouse milled at between 150° and 200° F. and 0.004″ clearance.

*Table III*

| Composition, Wt. percent | Greases | | |
|---|---|---|---|
| | A | B | C |
| Glacial Acetic Acid | 15.0 | 15.0 | 15.0 |
| p-Cresol | 4.0 | | |
| Mixed Cresols [1] | | | 4.0 |
| Xylenol [2] | | 4.0 | |
| Hydrated Lime | 11.5 | 11.0 | 11.5 |
| Phenyl α-Naphthylamine | 1.0 | 1.0 | 1.0 |
| Mineral Oil (55 SSU @ 210° F.) | 68.5 | 69.0 | 68.5 |
| Mol Ratio, Acid/Phenol | 6.8 | 7.6 | 6.8 |
| Properties: | | | |
| Dropping Point, °F | 500+ | 500+ | 500+ |
| Penetration, 77° F., mm./10— | | | |
| Unworked | 398 | 320 | 350 |
| Worked 60 Strokes | 325 | 325 | 335 |
| Worked 10,000 Strokes | 321 | 325 | 345 |
| Water Solubility (Boiling Water) | Insoluble | Insoluble | Insoluble |
| 4-Ball Wear Test Scar Diam. mm. (1,800 r.p.m.-10 Kg. Load @ 75° C. for 1 Hr.) | 0.21 | 0.26 | 0.24 |
| Lubrication life hours, 10,000 r.p.m. @ 250° F. [3] | 2,000+ | 2,000+ | 2,000+ |
| Timken Test (43 lbs. load) | Pass | Pass | |
| Almen Test (Wts. carried with excellent pin condition): | | | |
| Gradual Loading 15 wt. max | Pass | Pass | |
| Shock Loading 15 wt. max | Pass | Pass | |

[1] 54 Wt. percent m-cresol, 29 wt. percent p-cresol and about 17 wt percent of o-cresols and xylenols.
[2] 4,5-dimethyl phenol.
[3] Test discontinued after 2,000 hours.

As shown in Table III the greases prepared by coneutralizing acetic acid and cresols, xylenols and mixtures of the two in a mineral oil base have excellent extreme pressure and anti-wear properties. The greases prepared in this manner are also highly important in that they are formed at temperatures within the range of conventional steam heated grease kettles and in that they may be blended with additional lubricating oil to form liquid concentrate lubricating oil additives.

Excellent greases and additive compositions are also prepared by substituting for the mineral oil base and hydrated lime a synthetic ester oil of lubricating oil viscosity and a metal hydroxide selected from the group consisting of barium, chromium, cadmium, nickel, cobalt, iron, zinc and aluminum hydoxides.

EXAMPLE IV

An excellent high temperature grease, suitable as a multi-purpose lubricant, was prepared by coneutralizing a major portion of acetic acid and a minor portion of an alkyl amino phenol with calcium hydroxide. The alkylated amino phenol employed has the following structural formula:

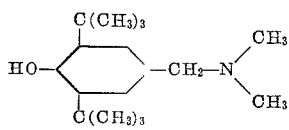

2,6-ditertiary butyl-4-(n-dimethyl-methylamino)-phenol

*Preparation.*—The mineral oil, lime and Hydrofol Acids (commercial mixture of fatty acids equivalent to stearic acid) was charged to a heated grease kettle and intimately mixed. To this mixture was charged the alkylated amino phenol dissolved in the acetic acid at 130° F. Heating was initiated after the heat of the reaction had subsided and the temperature raised to 410° F. The product was cooled rapidly and then milled by passage through a Morehouse mill having a clearance of 0.003″.

The composition in terms of weight percent and the properties of the resultant grease are given in Table IV.

*Table IV*

| | |
|---|---|
| Composition, wt. percent: | |
| Glacial acetic acid | 15.65. |
| Hydrofol acids | 2.08. |
| Alkyl amino phenol [1] | 2.08. |
| Hydrated lime | 11.22. |
| Mineral oil (55 SSU @ 210° F.) | 68.97. |
| Properties: | |
| Appearance | Excellent, smooth, bright yellow product. |
| Dropping point, ° F. | 500+. |
| Penetration, 77° F. mm./10— | |
| Unworked | 206. |
| Worked, 60 strokes | 267. |
| Worked, 10,000 strokes | 332. |
| Wheel bearing test, 220° F. | Pass. |
| 400° F. beaker test | No tendency to fluidize or soften excessively on either the heating or cooling cycle. |
| Water solubility (boiling water) | Insoluble. |
| Lubrication life hours 250° F.— | |
| 10,000 r.p.m. | 1896. |
| Timken test (45 lbs. load) | Pass. |

[1] 2,6-ditertiary butyl-4-(N,N-dimethyl-methylamino)-phenol.

The above example shows the preparation of excellent high temperature, extreme pressure and wear-resistant greases wherein an alkylated amino phenol is substituted for the alkyl phenol. The example also shows the use of fatty acid soaps in the greases of this invention and particularly the addition of the fatty acid soap to the mineral oil-lime mixture prior to coneutralization of the acetic acid and alkylated amino phenol.

Other alkylated amino phenols may be substituted for the 2,6-ditertiary butyl-4-(n-dimethyl-methylamino)-phenol, such as 2-methyl-4-(di-n-butylamino methyl) phenol, m-di-methyl amino phenol.

The above examples are merely illustrative of the compositions of this invention and are not intended to limit the invention in any way.

What is claimed is:

1. A composition of matter prepared by coneutralizing a mixture of a $C_2$ monocarboxylic acid and a phenol with alkaline earth metal base, and then heating to dehydrate the reaction mixture to form alkaline earth metal salts of said phenol and acid, wherein said phenol has the formula

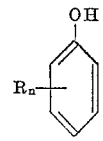

where R is selected from the group consisting of alkyl and alkyl amino groups having from 1 to 24 carbon atoms and $n$ represents an integer from 0 to 4, and wherein the mol ratio of said $C_2$ monocarboxylic acid to said phenol is between about 5/1 to 40/1.

2. A composition according to claim 1, wherein R is an alkyl group.

3. A composition according to claim 1, wherein R is an alkyl amino group.

4. A product prepared by co-neutralizing with lime a mixture of acetic acid and dodecyl phenol in a molar ratio of acetic acid to dodecyl phenol of about 5/1 to 40/1, and dehydrating by heating.

5. A product prepared by co-neutralizing acetic acid and cresol with lime, wherein the molar ratio of acetic acid to said cresol is about 5/1 to 40/1, and heating to dehydrate the reaction mixture.

6. A product prepared by co-neutralizing with lime a mixture of about one molar proportion of 2,6 ditertiary butyl-4-(N,N-dimethyl-methylamino)-phenol and about 5 to 40 molar proportions of acetic acid, followed by heading to dehydrate the reaction mixture.

7. A method comprising reacting a neutralizing amount of alkaline earth metal base with a mixture of a phenol and a low molecular weight $C_2$ monocarboxylic acid, followed by heating to dehydrate the resulting product, wherein said phenol has the formula:

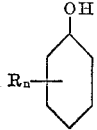

where R is selected from the group consisting of alkyl and alkyl amino groups having from 1 to 24 carbon atoms, $n$ represents an integer from 0 to 4, and wherein the mol ratio of said acid to said phenol is between 5/1 to 40/1.

References Cited in the file of this patent

UNITED STATES PATENTS

| | | |
|---|---|---|
| 2,178,809 | Rosenblatt | Nov. 7, 1939 |
| 2,363,510 | Farrington et al. | Nov. 28, 1944 |
| 2,376,313 | Reiff | May 15, 1945 |
| 2,731,418 | Howell et al. | Jan. 17, 1956 |
| 2,805,233 | Bell | Sept. 3, 1957 |
| 2,808,377 | Davidson et al. | Oct. 1, 1957 |

FOREIGN PATENTS

| | | |
|---|---|---|
| 545,138 | Canada | Aug. 20, 1957 |